US012695525B2

(12) United States Patent
Raich et al.

(10) Patent No.: US 12,695,525 B2
(45) Date of Patent: Jul. 28, 2026

(54) SPECTRUM SURVEILLANCE

(71) Applicant: Oregon State University, Corvallis, OR (US)

(72) Inventors: Raviv Raich, Corvallis, OR (US); Trung Vu, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 451 days.

(21) Appl. No.: 18/464,149

(22) Filed: Sep. 8, 2023

(65) Prior Publication Data

US 2025/0219749 A1     Jul. 3, 2025

Related U.S. Application Data

(60) Provisional application No. 63/376,242, filed on Sep. 19, 2022.

(51) Int. Cl.
*H04B 17/391* (2015.01)
(52) U.S. Cl.
CPC ..... *H04B 17/3912* (2015.01); *H04B 17/3913* (2015.01)
(58) Field of Classification Search
CPC ........................ H04B 17/3912; H04B 17/3913
See application file for complete search history.

(56) References Cited

U.S. PATENT DOCUMENTS

2015/0282176 A1 * 10/2015 MacLeod .............. H04W 24/02
370/329

OTHER PUBLICATIONS

Axell et al., "Spectrum Sensing for Cognitive Radio: State-of-the-art and Recent Advances," IEEE Signal Processing Magazine, vol. 29, No. 3, pp. 101-116, May 2012. doi: 10.1109/MSP.2012.2183771.
Ning et al., "Reinforcement Learning Enabled Cooperative Spectrum Sensing in Cognitive Radio Networks," in Journal of Communications and Networks. Mar. 19, 2022. vol. 22, Issue 1. pp. 12-22.
Yucek et al., "A Survey of Spectrum Sensing Algorithms or Cognitive Radio Applications," IEEE Communications Surveys & Tutorials. col. 11, No. 1, pp. 116-130. First Quarter 2009, doi: 10.1109/SURV.2009.090109.

* cited by examiner

*Primary Examiner* — Natasha W Cosme
(74) *Attorney, Agent, or Firm* — MUGHAL GAUDRY & FRANKLIN PC

(57) ABSTRACT
Described herein is scheme to manage a receiver assignment using information from a coarse power spectral density (PSD) obtained at every time and a systems' history of detections. The scheme of detecting or sensing signals in the spectrum applies reinforcement learning and relies on RF communications (e.g., covert communications and anomalous communication) and spectrum management. The scheme provides a low-cost and easy to deploy system of sensing signals in a wide spectrum with limited number of receivers.

20 Claims, 10 Drawing Sheets

Figure 3C:
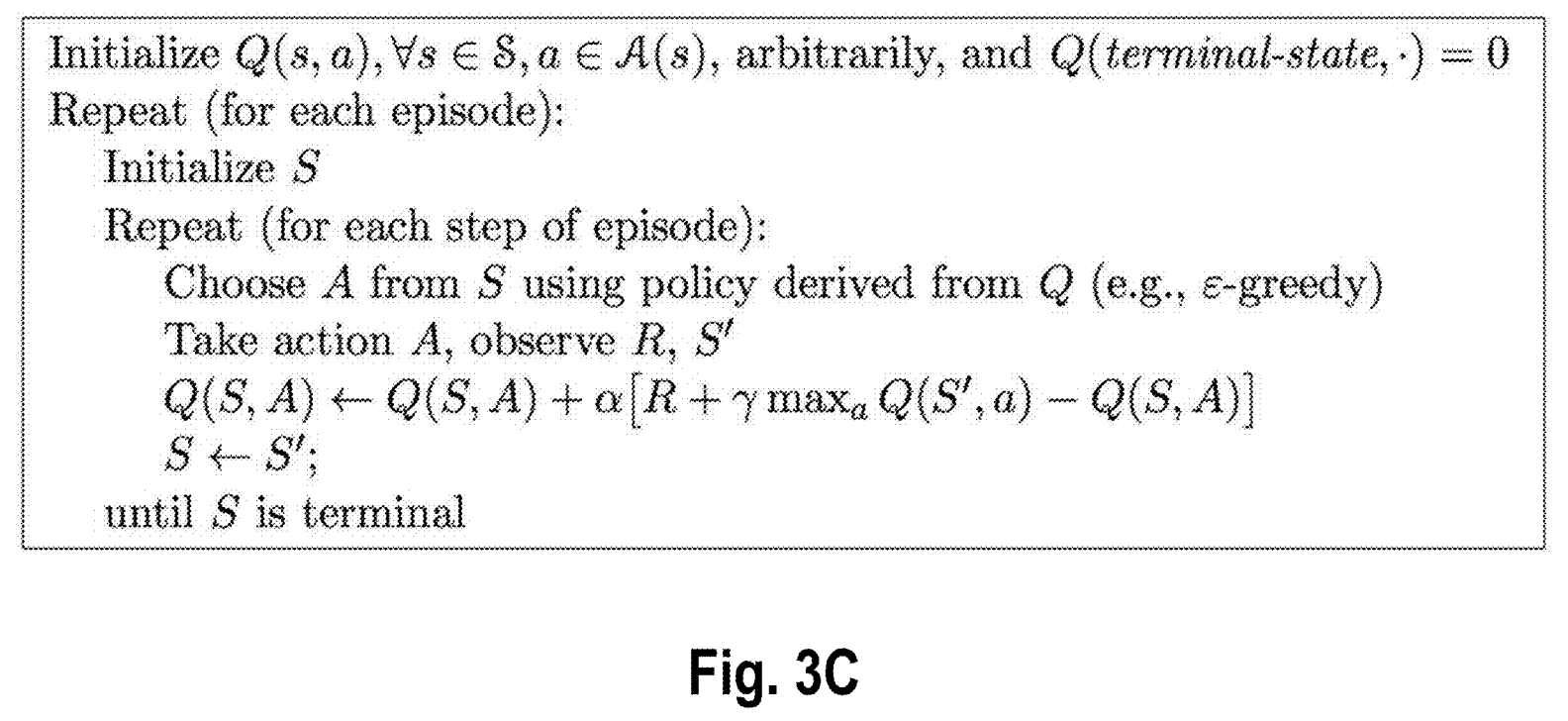

Initialize $Q(s, a), \forall s \in \mathcal{S}, a \in \mathcal{A}(s)$, arbitrarily, and $Q(terminal\text{-}state, \cdot) = 0$ Repeat (for each episode):

Initialize $S$

Repeat (for each step of episode):

Choose $A$ from $S$ using policy derived from $Q$ (e.g., $\varepsilon$-greedy)

Take action $A$, observe $R$, $S'$ $Q(S, A) \leftarrow Q(S, A) + \alpha [R + \gamma \max_a Q(S', a) - Q(S, A)]$ $S \leftarrow S'$;

until $S$ is terminal

Initialize: $\theta$ arbitrary parameter $\hat{Q}_{\theta}$

Loop for each episode:

Get initial stage $s$ for new episode

While $s$ is not terminal:

Choose $a$ via explore/exploit policy based on $\hat{Q}_{\theta}$

Take action $a$ and observe $r$ and $s'$ $$\hat{Q}(s_a) \leftarrow \hat{Q}(s_a) + \alpha \left( r + \gamma \max_{a' \in \{1,\ldots,N\}} \hat{Q}(s'_{a'}) - \hat{Q}(s_a) \right)$$

$s \leftarrow s'$

Fig. 3D

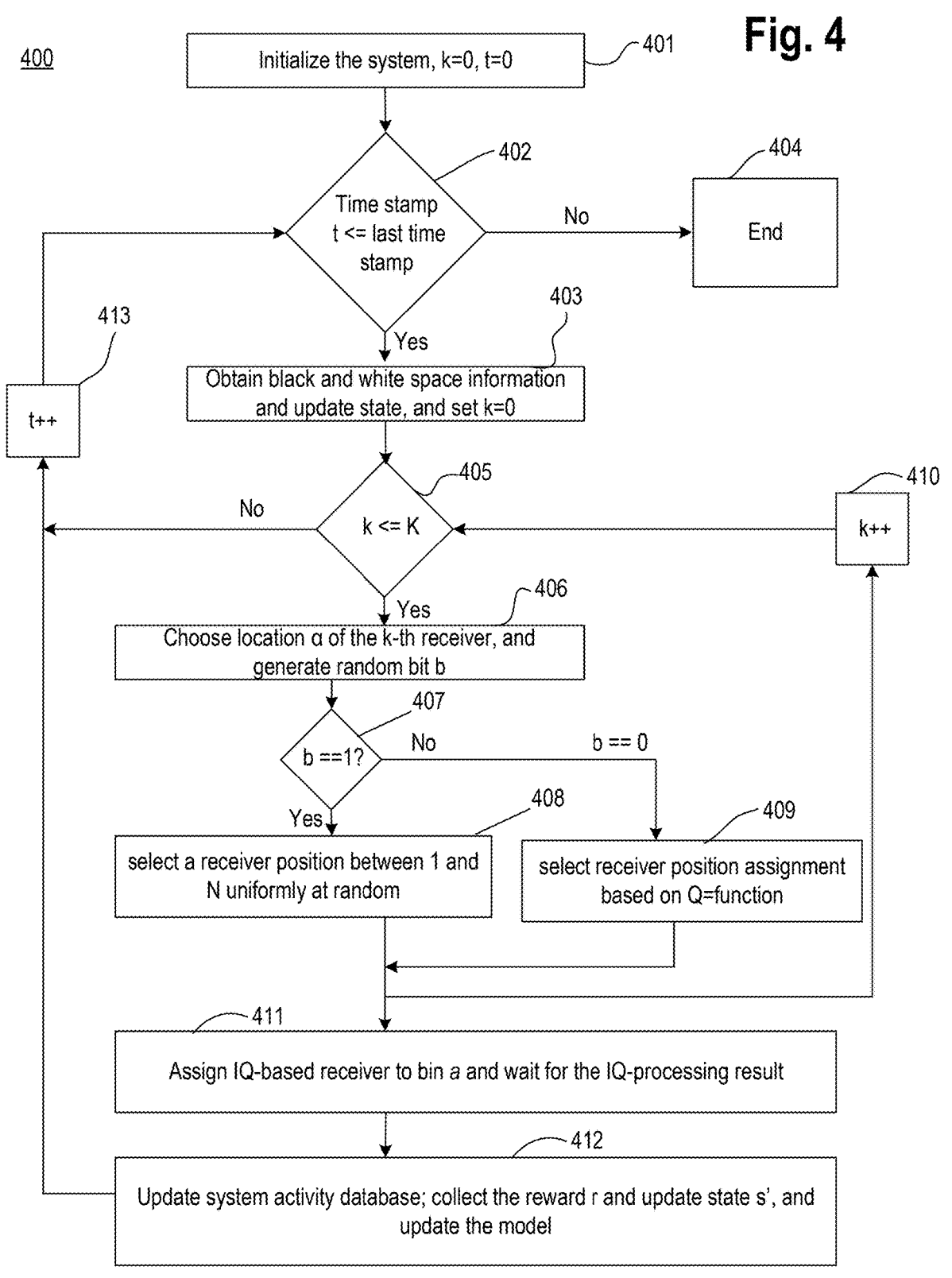

401 Initialize the system, k=0, t=0

402 Time stamp t <= last time stamp

No → 404 End

Yes

403 Obtain black and white space information and update state, and set k=0

413 t++

405 k <= K

No

Yes

406 Choose location a of the k-th receiver, and generate random bit b 407 b ==1?

No → b == 0

Yes 408 select a receiver position between 1 and N uniformly at random 409 select receiver position assignment based on Q=function 410 k++

411 Assign IQ-based receiver to bin a and wait for the IQ-processing result

412 Update system activity database; collect the reward r and update state s', and update the model

SPECTRUM SURVEILLANCE

CLAIM FOR PRIORITY

This application claims priority to U.S. Provisional Patent Application No. 63/376,242, filed on Sep. 19, 2022, titled "SYSTEM AND CORRESPONDING METHOD FOR SPECTRUM SURVEILLANCE," and which is incorporated by reference in entirety.

STATEMENT OF GOVERNMENT SUPPORT

The invention was made with Government support. The Government has certain rights in the invention. This invention was made with Government support awarded by the Intelligence Advanced Research Projects Activity (IARPA) Grant No. 21062400004.

BACKGROUND

A frequency spectrum may include radio frequency (RF) signals of different frequencies. These RF signals may comprise regular and known communication signals, non-communication electromagnetic emanations, and anomalous communications. Examples of known communication signals are cellular signals, Long Term Evolution (LTE) signals, WiFi signals, television (TV) broadcast signals, military and civil broadcast signals, Bluetooth signals, Advanced Television Systems Committee (ATSC) tuner signals, High-Definition TV tuner signals, Code Division Multiple Access (CDMA) signals, Digital Enhanced Cordless Telecommunications (DECT) signals, Digital Video Broadcasting Terrestrial (DVBT) signals, Global System for Mobile Communications (GSM) signals, Land Mobile Radio (LMR) signals, Long Range (LoRa) signals, Sirius signals, XM satellite radio signals, 5G new radio (NR) signals, etc. Examples of noncommunication electromagnetic emanations include energy associated with a device's internal clock or other periodic signals. Detection of anomalous communications can help in preventing security breaches. Since receivers that can analyze RF signals are bandwidth limited (e.g., they may merely observe a small fraction of a frequency spectrum), multiple (and potentially many) receivers are used to provide full coverage of the spectrum. Reading a very large map in darkness with a flashlight may light a small portion of the map. Providing coverage of the spectrum that preserves key relevant information is a challenge.

BRIEF DESCRIPTION OF THE DRAWINGS

At least one embodiment will be understood more fully from the detailed description given below and from the accompanying drawings of various embodiments of the disclosure, which, however, should not be taken to limit the disclosure to the specific embodiments, but are for explanation and understanding only.

FIG. 3C illustrates a pseudocode for learning an unknown Q-function for spectrum sensing with optimal number of receivers, in accordance with at least one embodiment.

FIG. 3D illustrates a pseudocode for learning an unknown Q-function with function approximation for spectrum sensing with optimal number of receivers, in accordance with at least one embodiment.

FIG. 4 illustrates a flowchart of the scheme for spectrum sensing with optimal number of receivers, in accordance with at least one embodiment.

DETAILED DESCRIPTION

Figure 1:
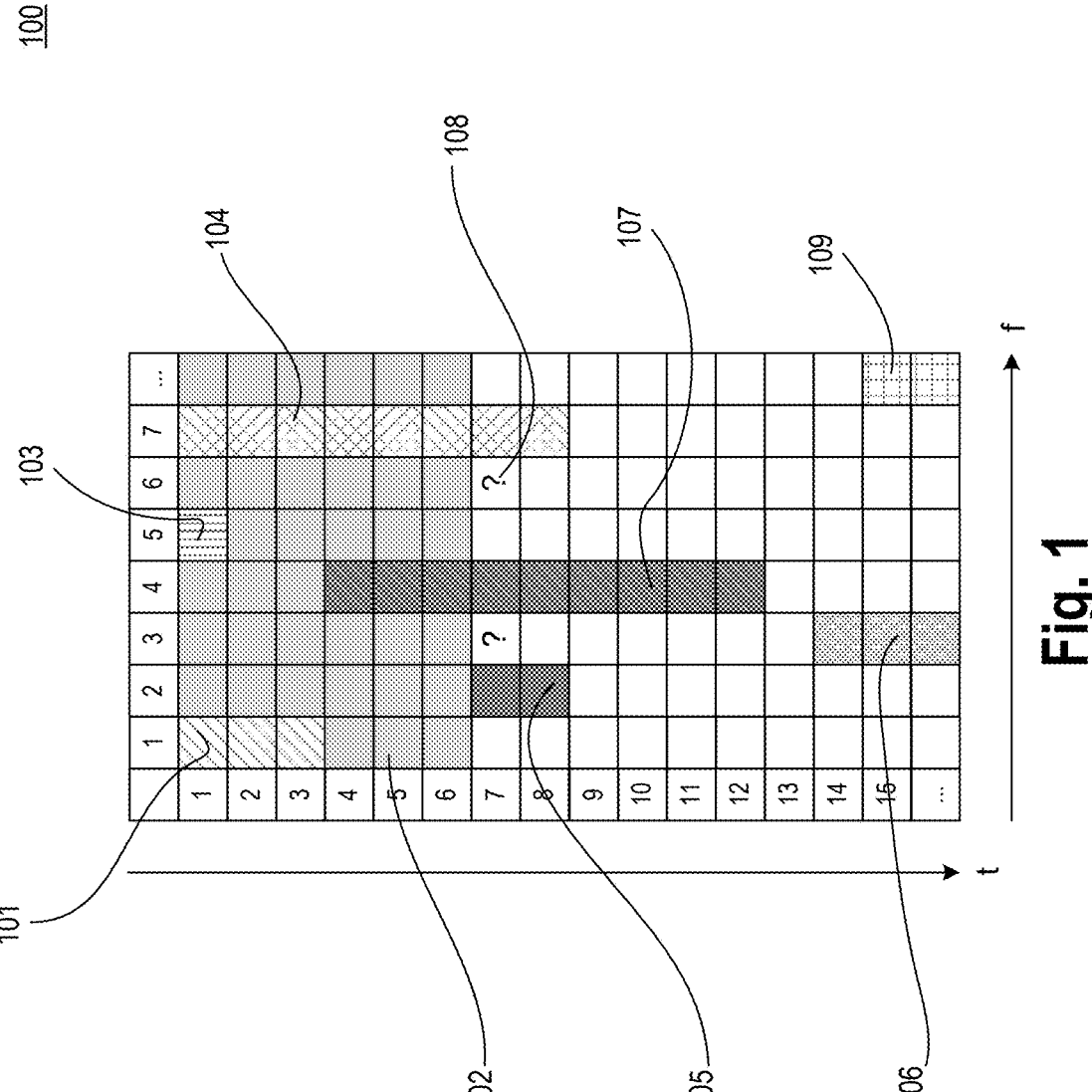
FIG. 1 illustrates a time varying spectrum and the challenge of receiver assignment to the spectrum.

One way to detect various signals in a frequency spectrum (herein referred to as spectrum) is by placing receivers in a sequential manner to cover a spectrum. For example, with a 6 GHz spectrum, a receiver that can examine 100 MHz at a time can first focus on a first frequency interval of 0 to100 MHz, then on a second frequency interval of 100 MHz to 200 MHz, and so on. After a cycle of 60 sequential assignments of receiver, 6 GHz spectrum can be covered. Assuming that (1) activity in spectrum is static or changes sufficiently slowly, and (2) additional units that perform detection and classification of activities within a Radio Frequency (RF) signal obtained by receiver are successful, task of characterizing all activities within spectrum can be accomplished successfully. However, since activities in spectrum may change over time, this approach may be insufficient and may not be able to handle the challenge of reliably covering time-varying spectrum in fewer time steps with limited number of receivers.

At least one embodiment describes a system and method (herein a scheme) of spectrum sensing with optimal number of receivers. Here, an optimal number of receivers may generally refer to a minimum number of receivers needed to sense signals in a frequency spectrum. In at least one embodiment, receivers may be turned adaptively for detecting anomalous communications. In at least one embodiment, receivers may include in-phase quadrature (IQ) receivers. At least one embodiment focuses on a frequency spectrum sensing system component that guides receiver placement to maximize the information about different signals present in a spectrum.

At least one embodiment manages a receiver assignment to a spectrum using information from a coarse power spectral density (PSD) obtained at every time and the systems' history of detections of RF signals. In at least one embodiment, a scheme of detecting or sensing signals in a frequency spectrum applies reinforcement learning (RL) and relies on RF communications (e.g., covert communications and anomalous communication) and spectrum management.

There are many technical effects of at least one embodiment. For example, at least one embodiment provides a low-cost and easy to deploy system of sensing signals in a wide spectrum with limited number of receivers. Other technical effects will be evident from at least one embodiment and figures.

At least one embodiment may be understood more fully from detailed description given below and from accompanying drawings, which, should not be taken as limiting, but are for explanation and understanding only. In the following description, numerous details are discussed to provide a more thorough explanation of at least one embodiment. It will be apparent, to one skilled in the art, that at least one embodiment may be practiced without these specific details. In other instances, well-known structures and devices are shown in block diagram form, rather than in detail, to avoid obscuring at least one embodiment.

Note that in corresponding drawings of at least one embodiment, signals are represented with lines. Some lines may be thicker, to indicate more constituent signal paths, and/or have arrows at one or more ends, to indicate primary information flow direction. Such indications are not intended to be limiting. Rather, the lines are used in connection with at least one embodiment to facilitate easier understanding of a circuit or a logical unit. Any represented signal, as dictated by design needs or preferences, may actually comprise one or more signals that may travel in either direction, and may be implemented with any suitable type of signal scheme.

It is pointed out that those elements of the figures having the same reference numbers (or names) as the elements of any other figure can operate or function in any manner like that described but are not limited to such.

FIG. 1 illustrates a time varying spectrum 100 and challenge of receiver assignment to a frequency spectrum. Here, x-axis for time-varying spectrum are frequency bins 'f' while y-axis is time 't' in arbitrary units. Various shaded and patterned boxes (e.g., 101, 102, 103, 104, 105, 106, 107, and 109) indicate types of signals at a certain frequency and various time regions. Here, different signals are present at different frequency bands for some limited time intervals. At least one embodiment describes a scheme to collect information about signals present in a spectrum using a limited number of receivers. In at least one embodiment, scheme also detects signals present in frequency bins observed. In at least one embodiment, problem receiver assignment to a frequency spectrum can be broken into two independent steps.

In at least one embodiment, these steps are performed regularly in each time instance (indicated by number on left-hand-side of FIG. 1). In at least one embodiment, in a first step, one or more circuitries or logic assign a receiver to a specific frequency bin in a frequency spectrum. For example, at time step 7 two receivers should be assigned as indicated by '?' sign and identifier 108, and optimal position (e.g., frequency bin) for each receiver is determined. In at least one embodiment, in a second step, one or more circuitries or logic classify signal type present in signal extracted by each receiver to inform system about signals present in explored frequency bin. In at least one embodiment, one or more circuitries or logic may use any suitable classification scheme.

At least one embodiment provides an approach to improve capability of system to collect information about activities (signals) in a spectrum using power spectral density (PSD) collected at each time step and previously collected information in past time instances. In at least one embodiment, receiver assignment step can be implemented with different levels of sophistication.

One way to scan and detect various signals (herein, Approach 1) in time-varying spectrums is to place receivers throughout spectrum. These receivers are used for scanning frequency spectrum from left-to-right without any use of information from a coarse power spectral density collected or history of identified signals in spectrum. For example, denoting 0 to 100 MHz as frequency bin 1, 100 MHz to 200 MHz as frequency bin 2, and so on, system could then cover bins one by one in ascending order and repeat after all bins have been covered.

Figure 2:
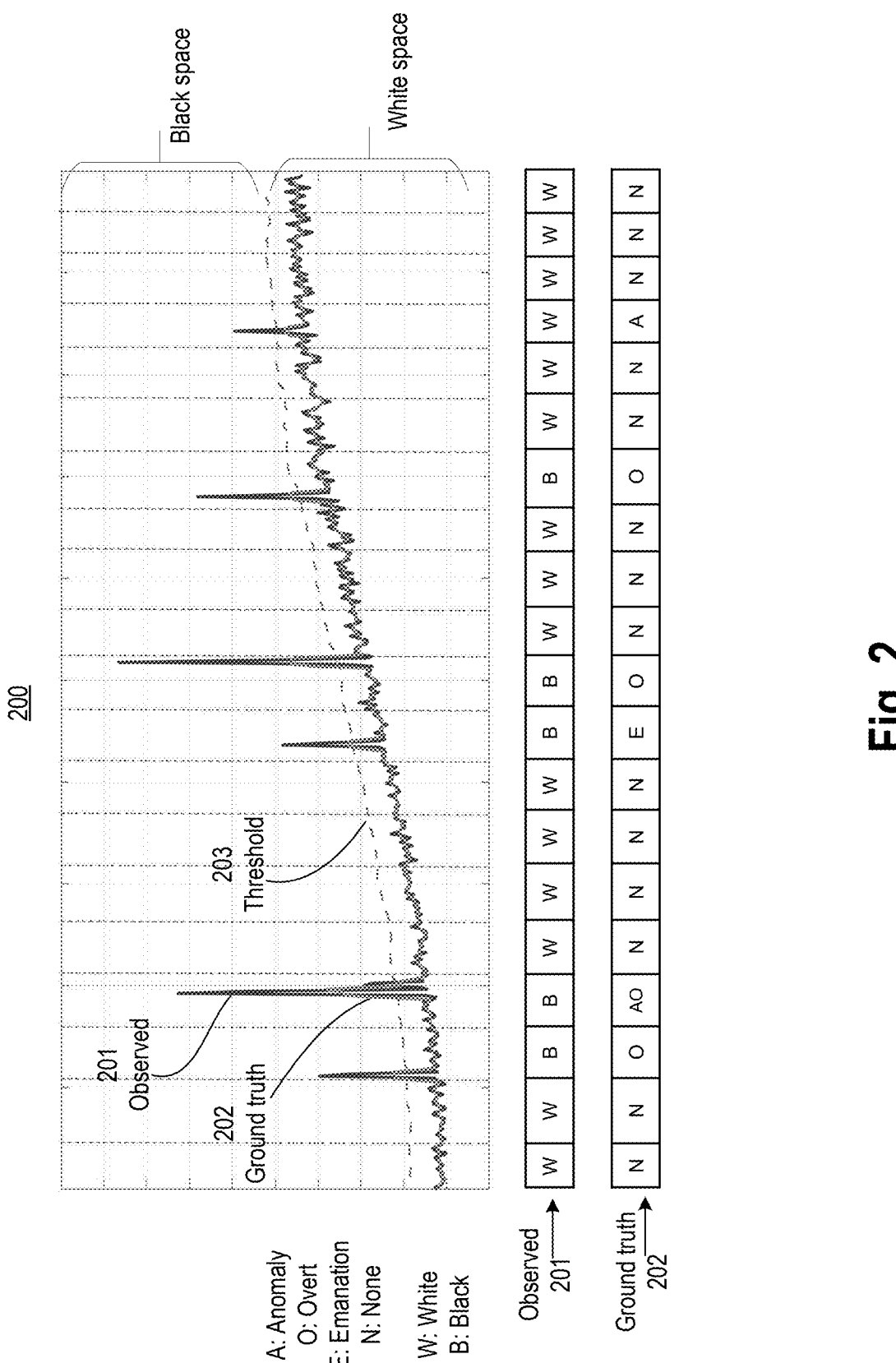
FIG. 2 illustrates a plot showing a power spectral density (PSD) of the spectrum.

FIG. 2 illustrates plot 200 showing power spectral density (PSD) of a frequency spectrum. Plot 200 shows observed PSD 201, ground truth PSD 202, and threshold 203. An approach of placing receivers sequentially throughout a frequency spectrum may lead to inefficient use of resources. Prioritizing equally to place receivers in black spaces (B) and in white spaces (W) implies that receivers may spend time unnecessarily in regions of spectrum with low probability of finding activities. Here, "black spaces" or 'B' generally refers to regions in time-varying spectrum that have evidence of signals. For example, when PSD in a region of a spectrum is above a threshold (e.g., threshold 203), that region is marked as a black space. Here, "white spaces" or 'W' generally refers to regions in a time-varying spectrum that have no signals. For example, when PSD in a region of a spectrum is below a threshold e.g., threshold 203), that region is marked as a white space.

Another way to scan and detect various signals (herein, Approach 2) is to separate a frequency spectrum into regions where power spectral density exceeds a threshold (termed a black space) and regions where the power spectral density does not exceed threshold (termed a white space). Since regions with high energy imply presence of signals, a higher priority can be assigned to black spaces and a lower priority can be assigned to white spaces. For example, a large subset of receivers can be sequentially assigned to black spaces and remaining subset of receivers can be sequentially assigned to white spaces, in accordance with at least one embodiment.

While Approach 2 differentiates between different frequency bins based on likelihood of activity being present, it assigns priorities in a fixed manner. Since an RF scene may not be stationary, Approach 2 may do well some time and poorly other times. For example, if important anomalies are initially present in a white space but in a later period shift to black spaces, fixed priorities for black spaces and for white spaces that concentrate on white spaces may yield more detections in a first period but less in a later period.

Figure 3A:
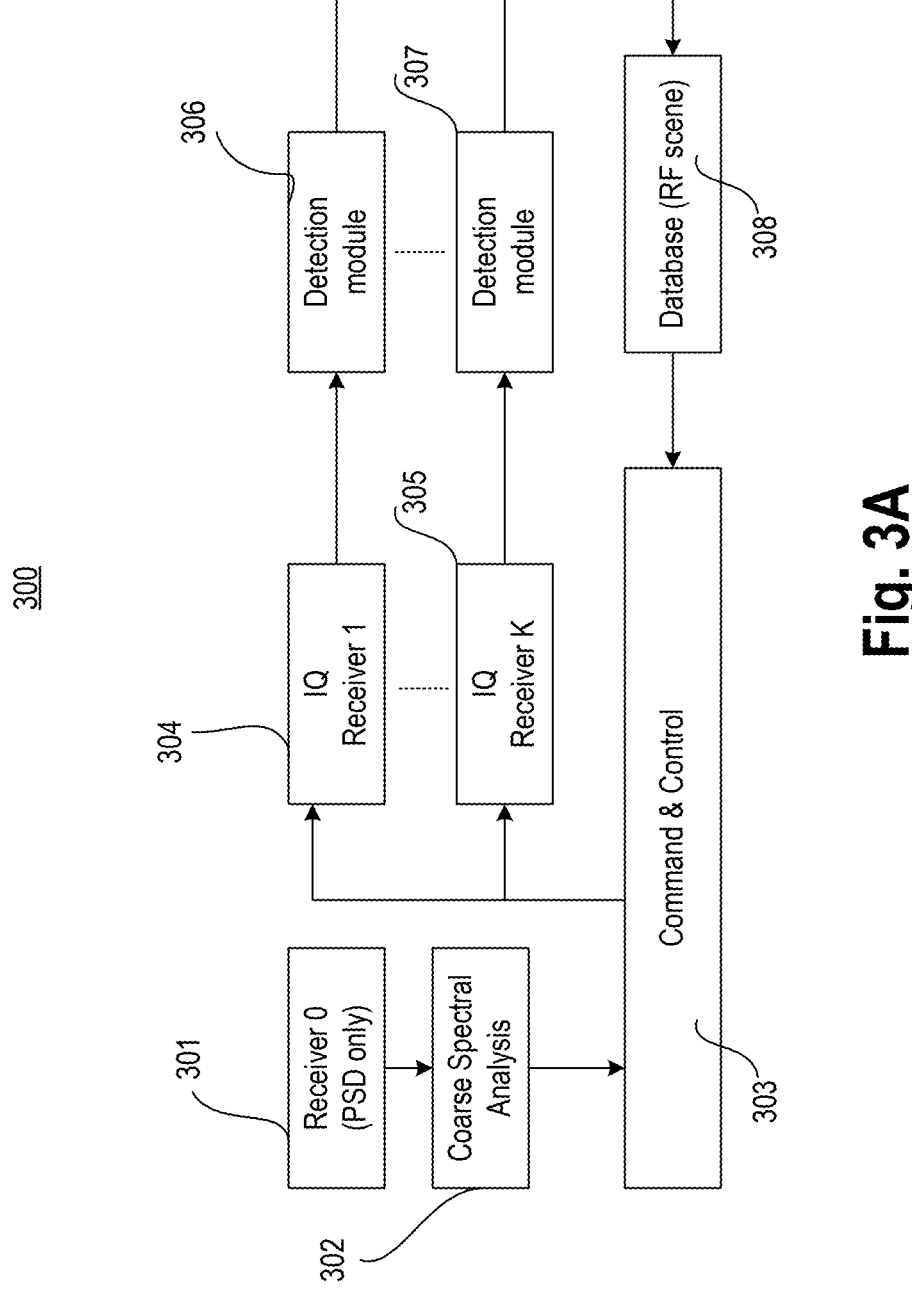
FIG. 3A illustrates a high-level block diagram for spectrum sensing with optimal number of receivers, in accordance with at least one embodiment.

FIG. 3A illustrates a high-level block diagram 300, in accordance with at least one embodiment. In at least one embodiment, high-level block diagram 300 illustrates hardware and software modules for managing receiver assignment using information from coarse PSD obtained at every time and system's history of detections of RF signals. In at least one embodiment, scheme implemented by high-level block diagram 300 relies on reinforcement learning, radio frequency communications (e.g., covert communications and anomalous communications), and spectrum management.

In at least one embodiment, high-level block diagram 300 includes one or more modules or circuits to provide PSD from first receiver 301 (e.g., receiver 0), coarse spectral analysis module 302, command-and-control circuitry block 303, K number of IQ receivers 304 through 305, K number of detection modules (e.g., detection module 306 through detection module 307) associated with the corresponding receivers, and database 308 that contains an RF scene, where 'K' is a positive integer.

In at least one embodiment, command-and-control circuitry block 303 executes a scheme for spectrum management including detecting or sensing signals in a frequency spectrum. In at least one embodiment, command-and-control circuitry block 303 takes input from database 308 about presence of signals in a frequency spectrum as well as information from coarse spectral analysis module 302 about black and/or white spaces. In at least one embodiment, coarse spectral analysis module 302 performs a coarse band-of-interest detection. In at least one embodiment, after executing scheme, command-and-control circuitry block 303 produces a list of positions (e.g., frequency bins) to place IQ receivers in.

In at least one embodiment, a receiver may include an antenna, a low-noise amplifier coupled to the antenna, a filter, a local oscillator, a down-converter, and a sampling circuitry. In at least one embodiment, an individual detection module (e.g., one of detection modules 306 through 307) may include a filter which is tuned to detect a signal in a particular frequency band of frequency spectrum. In at least one embodiment, command-and-control circuitry block 303 provides tuning settings for IQ receiver and/or detection modules 306 through 307 to detect or sense signals in frequency bands of frequency spectrum. In at least one embodiment, detection modules 306 through 407 store properties of signals detected by detection modules 306 through 407 in database 308.

In at least one embodiment, scheme executed by command-and-control circuitry block 303 is based on reinforcement learning (RL). In this approach, in at least one embodiment, current state 's' is:

$$S = [s_1, \ldots, s_N]$$

where N is number of frequency bins and $s_i$ represents state of i-th bin. In at least one embodiment, state of i-th bin $s_i = [d_i, c_i, b_i]$, comprises type of activities detected most recently in bin, $d_i$ time passed since last detection of most recent activity $c_i$, and whether bin is a black or white space $b_1$. Here, $b_1 \, E \, \{0,1\}$(e.g., white or black space), $c_i \in \{1, \ldots, c_{max}\}$(e.g., time since last visit), $d_i$ is the most recent activity (overt baseline, overt anomaly, emanation baseline, emanation anomaly, . . . etc.), action $\alpha \in \{1, \ldots, N\}$ is chosen location of IQ-based receiver, and this action is repeated K times at each time stamp. In at least one embodiment, state of i-th bin $s_i$ can be determined using above activities $d_i$, $c_i$, $b_i$, a subset of them, and/or other activities such as similar information from neighboring bins, information from antennas (such as direction of antennas), antenna used, identification of receiver used, etc. In at least one embodiment, principle of RL can be used with other factors or activities.

In at least one embodiment, by quantizing time since last detection, state is a discrete value that takes product of number of values for activity type, by number of time (since the last activity) values, and by 2 (two possible values for black and/or white space category). In at least one embodiment, by breaking each time step into separate K steps (one for each IQ receiver), at each step, one or more circuitries (e.g., command-and-control circuitry block 303) determines location (freq. bin) to place current receiver. This takes N possible values, in accordance with at least one embodiment. In at least one embodiment, if a receiver is placed in bin 'a' and an activity has been detected, then reward 'r' for detecting this activity is given by:

$$r = r_a = \begin{cases} R(d_a) \cdot c_a, & d'_a = d_a \\ R(d'_a), & d'_a \neq d_a \end{cases}$$

Where per-activity reward is given by the following table:

TABLE 1

| Activity (d) | Reward (user policy-based), R(d) |
|---|---|
| No activity | 0 |
| Activity type 1 | Reward value 1 |
| Activity type 2 | Reward value 2 |
| . . . | . . . |
| Activity type D | Reward value D |

In at least one embodiment, alternative rewards that are based on other state variables such as $b_i$ may be used instead of or in addition to da and/or Ca. In at least one embodiment, if one or more circuitries (e.g., command-and-control circuitry block 303) determines that receiver placement results in detecting that current activity in bin was unchanged then reward is collected for all time instance since last detection (a product of c and R(d)). In at least one embodiment, if one or more circuitries (e.g., command-and-control circuitry block 303) detects that activity is new for bin then a reward is collected for a single time instance.

In at least one embodiment, state is updated using $$s'_i = [b'_i, c'_i, d'_i]$$

$$b'_i = \begin{cases} b_i & \text{before new } B/W \text{ determination} \\ \text{update} & \text{otherwise} \end{cases}$$

$$c'_i = \min(1 + l_{i \neq a} \cdot c_i, c_{max}),$$

reset counter upon IQ receiver assignment, where counter is capped at $c_{max}$ $$d'_i = \begin{cases} \text{update} & \text{if}(i = a) \text{ AND (new activity detected other than } d_i) \\ d_i & \text{otherwise} \end{cases}$$

where $$s'_i$$

is the updated state.

In at least one embodiment, by defining state space, action space, instant reward mechanism, and state update mechanism, a Q-learning approach can be applied to the problem. In at least one embodiment, a Q-table is considered for an entire state vector 's' that is written as a sum of individual Q-tables for each bin. In at least one embodiment, the model discussed herein reduces complexity significantly which otherwise would cause state dimension to be exponential in N (the number of frequency bins). In at least one embodiment, one or more circuitries (e.g., command-and-control circuitry block 303) applies an E-greedy approach to Q-learning off-policy to determine number of receivers to sense or scan a frequency spectrum.

In at least one embodiment, one or more circuitries (e.g., command-and-control circuitry block 303) maps problem to reinforcement learning formulation. In at least one embodiment, one or more circuitries (e.g., command-and-control circuitry block 303) applies a simplified model for Q-table that reduces number of table entries from exponential in number of frequency bins to linear in number of states-per-bin. In at least one embodiment, reinforcement learning formulation and simplified model for Q-table allow for a feasible implementation resulting in an optimized number of receivers to sense or scan a frequency spectrum. In at least one embodiment, other methods for mapping states to RL can be used to determine an optimized number of receivers to sense or scan a frequency spectrum.

Figure 3B:
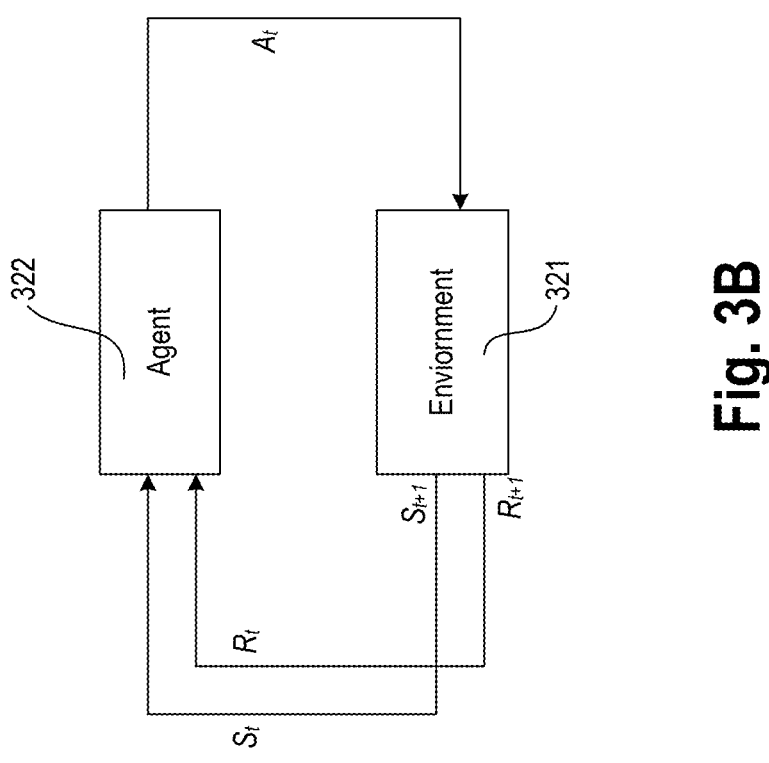
FIG. 3B illustrates a reinforcement learning scheme, in accordance with at least one embodiment.

FIG. 3B illustrates a reinforcement learning scheme 320, in accordance with at least one embodiment. In at least one embodiment, one or more circuitries (e.g., command-and-control circuitry block 303) or software train agent 322 (e.g., number of receivers) to optimally interact with environment 321 (e.g., state, type of RF signal, frequency band, black or white space) to maximize a cumulative reward. In at least one embodiment, reinforcement learning scheme is based on an explore-exploit combination. Here, "explore" action refers to different actions to learn their associated reward obtained in different states of the environment. Here, "exploit" may generally refer to optimizing an action policy to maximize the cumulative reward.

At least one embodiment, one or more circuitries (e.g., command-and-control circuitry block 303) or software applies a Markov Decision Process (MDP) to design a policy, for example, a strategy for assigning actions given a current state, that yields a maximum accumulated reward. Here, state characterizes status of environment 321. Here, "action" may be action taken by an agent that can change an environment and can produce a reward. Here, "reward" may be an instantaneous or immediate reward for taking an action.

In at least one embodiment, in MDP, S is a finite set of states, A is a finite set of actions, P is a state transition matrix (which may be an unknown), R is a reward function (which may be unknown), and $\gamma$ is a discount factor. In at least one embodiment, P can be expressed as:

$$P_{ss'}^{a} = P(S_{t+1} = s \mid S_t = s', A_t = a)$$

In at least one embodiment, R can be expressed as:

$$R_s^a = E[R_{t+1} \mid S_t = s, A_t = a]$$

In at least one embodiment, environment 321 is Tully observable. For example, in at least one embodiment, $S_t$ contains all useful information from history until current time step t. In at least one embodiment, states satisfy Markov property as follows:

$$P(S_{t+1} \mid S_t) = P(S_{t+1} \mid S_1, \ldots, S_t)$$

As discussed herein, in at least one embodiment, discounted reward $\gamma$ is 0 or 1 e.g., $\gamma \in [0,1]$. In at least one embodiment, for $\gamma < 1$, values immediate reward above delayed reward.

In at least one embodiment, a distribution over actions given states can be expressed as:

$$\pi(a \mid s) = P(A_t = a \mid S_t = s)$$

In at east one embodiment, state transition matrix $P^{\pi}$ and reward $R^{\pi}$ can be expressed as:

$$P_{ss'}^{\pi} = \sum_{a \in A} \pi(a \mid s) P_{ss'}^{a}$$

$$P_s^{\pi} = \sum_{a \in A} \pi(a \mid s) R_s^a$$

In at least one embodiment, state-value function is expresses as:

$$V_{\pi}(s) = E_{\pi}\left[\sum_{k=0}^{\infty} \gamma^k R_{t+k+1} \,\middle|\, S_t = s\right]$$

In at least one embodiment, action-value function, which is an RL policy, can be expressed as:

$$Q_{\pi}(s, a) = E_{\pi}\left[\sum_{k=0}^{\infty} \gamma^k R_{t+k+1} \,\middle|\, S_t = s, A_t = a\right]$$

The following section describes Q-Learning for Off-Policy Control, in accordance with at least one embodiment. In at least one embodiment, if some of previous quantities are unknown (e.g., transition matrix or reward function), then the Q-function is unknown, and it is learned.

FIG. 3C illustrates pseudocode 330 for learning the unknown Q-function, in accordance with at least one embodiment. In at least one embodiment, one or more actions of functions of pseudocode 330 can be performed or controlled by software, hardware, or a combination of them (e.g., command-and-control circuitry block 303). In at least one embodiment, pseudocode 330 describes off-policy Q-learning algorithm used for learning value of action for each state. In at least one embodiment, Q-function can be used by applying a policy that selects an action that maximizes value of Q-function given a specific state. In at least one embodiment, pseudocode 330 is used as a basis for a method discussed herein.

FIG. 3D illustrates pseudocode 340 for learning an unknown Q-function with function approximation for spectrum sensing with optimal number of receivers, in accordance with at least one embodiment. In at least one embodiment, pseudocode 340 writes a Q-function as a sum of Q-functions, one for each frequency bin. In at least one embodiment, one or more actions of functions of pseudocode 340 can be performed or controlled by software, hardware, or a combination of them (e.g., command-and-control circuitry block 303). In at least one embodiment, pseudocode 340 is an application of pseudocode 330. In at least one embodiment, pseudocode 340 relies on a linear function approximation of Q-function. In at least one embodiment, pseudocode 340 facilitates an efficient update of approximation coefficients. In at least one embodiment, at each iteration, one entry of Q-function table corresponding to action is updated.

FIG. 4 illustrates flowchart 400 of the scheme, in accordance with at least one embodiment. In at least one embodiment, various blocks here can be performed by hardware, software, or a combination of both. In at least one embodiment, some or all blocks of flowchart 400 can be performed by command-and-control circuitry block 303. While various blocks here are illustrated in a particular order, order can be modified, in accordance with at least one embodiment. In at least one embodiment, some blocks may be performed before others and some blocks may be performed in parallel.

In at least one embodiment, at block 401, system (e.g., high-level block diagram 300) is initialized. For example, in at least one embodiment, current receiver number 'k' is initialized to 0 and time stamp is initialized to 0. In at least one embodiment, at block 402 a determination is made whether current time stamp t is less or equal to last time stamp. In at least one embodiment, if current time stamp is less than or equal to last time stamp, processor proceeds to block 403. In at least one embodiment, if the time entire time zone is processed (e.g., the current time stamp t is greater than the last time stamp), the process completes at block 404.

In at least one embodiment, at block 403 black and white space (B/W-space) information is obtained and the state is updated. In at least one embodiment, band-of-interest (BoI) coarse detection is performed to obtain the B/W-space information. In at least one embodiment, BoIs are obtained by thresholding a power spectral density (PSD). In at least one embodiment, contiguous intervals in which the PSD is above the threshold are denoted as BoIs. In at least one embodiment, coarse band-of-interest is obtained by a separate receiver that can generate a PSD. In at least one embodiment, coarse BoI information is stored in the database. In at least one embodiment, fine BoIs are obtained after the IQ receivers (receivers that obtain the time-domain sampled signal) collect samples and those in term are converted into a PSD. In at least one embodiment, fine BoIs are stored in the database. In at least one embodiment, PSD is used to generate the fine BoI. In at least one embodiment, state information is updated by B/W-space information and counters. In at least one embodiment, updated B/W-space information and values of the counters are stored in the database. In at least one embodiment, counters keep record in each frequency bin of time since a receiver was placed in bin and an activity was detected. In at least one embodiment, information from counters can inform how long since an activity in bin was last observed.

In at least one embodiment, for each time stamp or time step t a process is performed to determine a location of a receiver in a frequency spectrum. In at least one embodiment, k is initialized to 0, where k is the current receiver from among K receivers. In at least one embodiment, for each receiver number k (the current k-th receiver), from among a total of K receivers, a location a is selected for the current k-th receiver. In at least one embodiment, process is performed by a loop comprising blocks 405, 406, 407, 408, 409, and 410. In at least one embodiment, at block 405, a determination is made whether the entire number of receivers K has been processed. In at least one embodiment, if current receiver number is less than or equal to K, then process proceeds to block 406. Otherwise, process proceeds to block 413.

In at least one embodiment, at block 406, for the selected location a of the current receiver (e.g., k-th receiver), a random bit b is generated by a random bit generator. In at least one embodiment, the random bit has a probability epsilon (E) for bit 1 and one minus epsilon (e.g., 1-(ε)) for bit 0. In at least one embodiment, epsilon denotes a probability (a number between 0 and 1) that indicates what percentage of time scheme would place a receiver in a random bin. In at least one embodiment, complementary probability 1-ε denotes probability that a receiver is placed in an optimal fashion using Q-table.

In at least one embodiment, a simplified way to express the probability is:
P(b=0)=(ε) [which is same as w.p. (ε)]
P(b=1)=1−(ε) [which is same as w.p 1−(ε)]

In at least one embodiment, at block 407 value of bit is compared to 1. In at least one embodiment, if the bit is 1 the process proceeds to block 408. In at least one embodiment, at block 408 a receiver position is selected between 1 and N uniformly at random. In at least one embodiment, if the bit is 0 the process proceeds to block 409. In at least one embodiment, at block 409 a receiver position assignment is selected based on a Q-function:

$$a = \arg\max_i Q(s_i)$$

In at least one embodiment, selection of receiver position using Q-function is performed by maximizing the Q-function with respect to bin placement to obtain a as in formula above. In at least one embodiment, selection of receiver position is determined by finding frequency bin for which state is returning high value in Q-function. In at least one embodiment, process then proceeds to block 410 where same analysis is performed for next k-th receiver from among K receivers.

In at least one embodiment, at block 411 an IQ-based receiver is assigned to a frequency bin a. In at least one embodiment, thereafter process waits for IQ-processing result. In at least one embodiment, IQ-processing result is a fine BoI detection and classification output for each BoI. In at least one embodiment, for each band-of-interest, samples obtained by IQ-receiver placed in each bin are analyzed by a classifier to determine type of signal(s) present in frequency bin analyzed. In at least one embodiment, output from classifier can be a name of communication type represented by signal or a higher-level category such as a normal communication signal and an anomalous communication signal.

In at least one embodiment, at block 412 system activity database is updated. In at least one embodiment, reward r is collected and resulting state s' is updated. In at least one embodiment, resulting state s' is activity information and counter value. In at least one embodiment, different applications can adjust activity information and/or counter value. Here, "activity information" generally refers to type of signals observed. In at least one embodiment, counters indicate when such activity was detected (if a bin has not been visited for a while, then counter value for activity that was observed in that bin should have a large value. In at least one embodiment, type of signal (as noted above) could be decided by a user. In at least one embodiment, at a very coarse level a user can decide to differentiate between normal activity and anomalous activity. In at least one embodiment, a user can decide to provide a finer granularity (e.g., overt signal, emanation, overt and emanation, overt and anomaly, anomaly, etc.) based on their interest. In at least one embodiment, if the system is deployed to detect emanations then signal types of emanations are indicated.

In at least one embodiment, thereafter, the RL-model is updated as follows:

$$Q(s_a) \leftarrow Q(s_a) + \alpha \left( r + \gamma \max_{a' \in \{1,...,N\}} Q(s'_{a'}) - Q(s_a) \right)$$

In at least one embodiment, process then proceeds to block 413 where current time stamp t is advanced, and process proceeds to block 402. In at least one embodiment, thereafter, location of receiver for next time step is determined until all time steps are completed.

Figure 5:
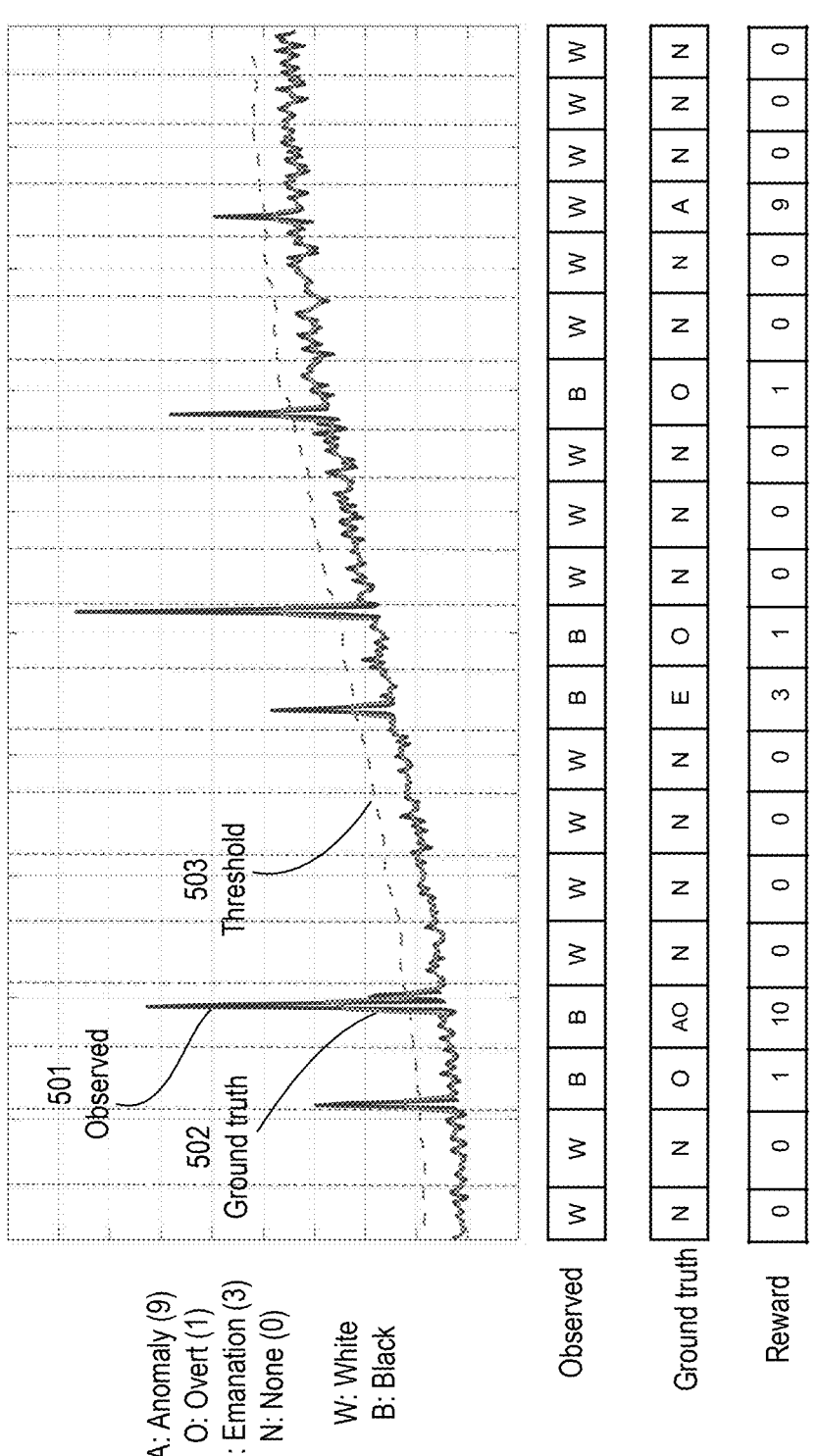
FIG. 5 illustrates a plot showing a PSD of the spectrum and values of reward according to the scheme, in accordance with at least one embodiment.

FIG. 5 illustrates plot 500 showing PSD of the spectrum and values of reward according to the scheme, in accordance with at least one embodiment. Plot 500 shows observed PSD 501, ground truth PSD 502, and threshold 503. In at least one embodiment, state at each bin is indicated by presence (B) or absence (W) of detected signal in bin and current communication activity type in bin (e.g., Anomaly, Overt Communication). In at least one embodiment, reward for placing a receiver in each frequency bin is illustrated (e.g., placing a receiver in a bin that contains anomaly will generate a higher reward than placing a receiver in a bin that contains no activity).

Figure 6:
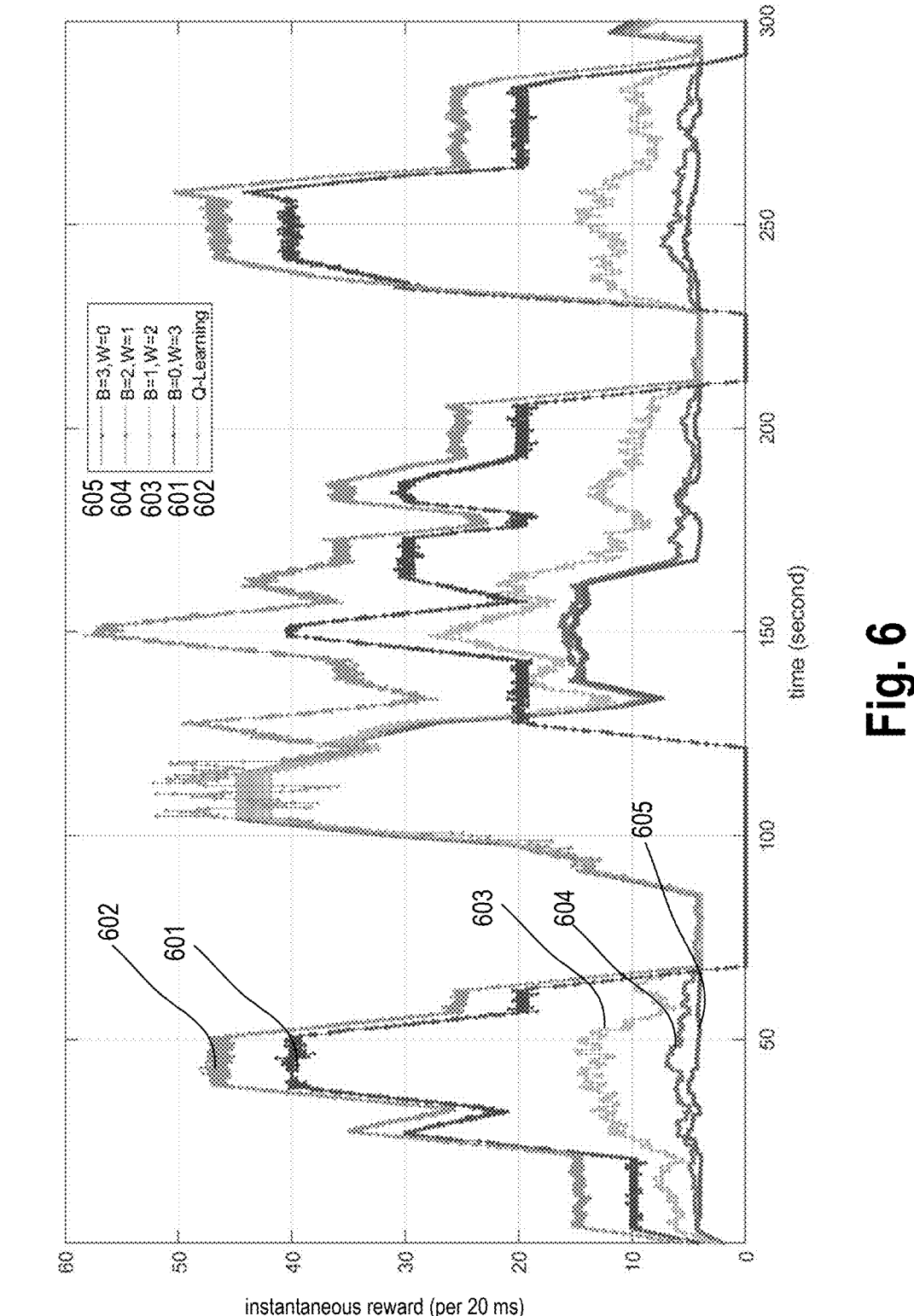
FIG. 6 illustrates a plot showing effectiveness of the scheme, in accordance with some embodiments of the disclosure.

FIG. 6 illustrates plot 600 showing effectiveness of the scheme, in accordance with at least one embodiment. In at least one embodiment, plot 600 shows a simulation where the goal of placing 3 receivers at each time step is set to detect whether bins contain an overt communication signal (with reward of 0.1) or an anomalous signal (with reward of 10) in each of 60 frequency bins. In at least one embodiment, results are compared to four different fixed-schedule approach in which (3–t, t) receivers are assigned to black spaces and white spaces respectively, with t=0, 1, 2, 3.

In at least one embodiment, at time where RF scene is changing to have no anomalies (that collect a large reward) present in white spaces, approach indicated by waveform 601 returns 0 reward since it assigns no receivers to black spaces. In at least one embodiment, when anomalies are present in white spaces, reward from the fixed-schedule approaches that assign either 2, 1, or 0 (e.g., not all 3 receivers) is low compared to that of method allocating 3 receivers to white space (waveform 601). In at least one embodiment, using adaptive nature of reinforcement learning, approach (waveform 602) adapts receiver allocation scheme and collects more (or similar) reward at each time instance than any of the fixed-schedule approaches.

Below is a comparison of overall reward collected during the evaluation period. Note, that second-best approach is merely 64% as efficient as the approach of various embodiments.

TABLE 2

| Method | Total (5 min) Reward | Relative to Q-Learning |
|---|---|---|
| B = 3, W = 0 (waveform 605) | 14110 | 0.3427 |
| B = 2, W = 1 (waveform 604) | 15029 | 0.3651 |
| B = 1, W = 2 (waveform 603) | 19999 | 0.4858 |
| B = 0, W = 3 (waveform 601) | 26264 | 0.6380 |
| Q-Learning (waveform 602) | 41169 | 1 |

At least one embodiment is used to address the government's need to automatically detect and characterize RF anomalies that may indicate a compromise of secure data in complex RF environments. In at least one embodiment, scheme discussed herein may also be used for corporate espionage by detecting actors who are listening and broadcasting what they hear. In at least one embodiment, scheme discussed herein may also be applied for commercial use of spectrum that is unauthorized.

Figure 7:
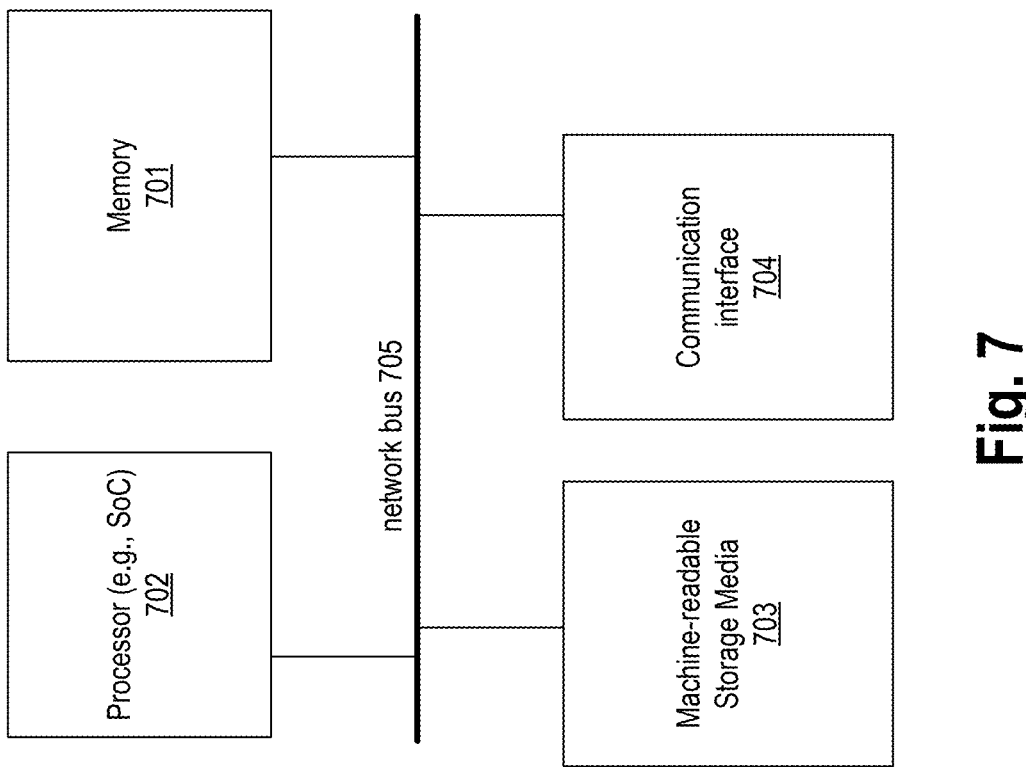
FIG. 7 illustrates a command-and-control circuitry with one or more machine-readable medium having instructions to perform the scheme, in accordance with at least one embodiment.

FIG. 7 illustrates a command-and-control circuitry block 700 with one or more machine-readable medium having instructions to perform the scheme, in accordance with at least one embodiment. In at least one embodiment, command-and-control circuitry block 700 is part of a computer platform. Elements of at least one embodiment are also provided as a machine-readable medium (e.g., memory) for storing the computer-executable instructions (e.g., instructions to implement any other processes discussed herein). In at least one embodiment, computing platform comprises memory 701, processor 702, machine-readable storage media 703 (also referred to as tangible machine-readable medium), communication interface 704 (e.g., wireless or wired interface), and network bus 705 coupled together as shown.

In at least one embodiment, processor 702 is a Digital Signal Processor (DSP), an Application Specific Integrated Circuit (ASIC), a general-purpose Central Processing Unit (CPU), or a low power logic implementing a simple finite state machine to perform the method described herein, etc.

In at least one embodiment, various logic blocks of the system are coupled together via network bus 705. Any suitable protocol may be used to implement network bus 705. In at least one embodiment, machine-readable storage media 703 includes instructions (also referred to as the program software code/instructions) for spectrum sensing with minimum number of receivers as described with reference to various embodiments and flowchart.

In at least one embodiment, program software code/instructions associated with the methods and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In at least one embodiment, program software code/instructions associated with various embodiments are executed by computer platform.

In at least one embodiment, program software code/instructions associated with various flowcharts are stored in a computer executable storage medium and executed by processor 702. Here, machine-readable storage media 703 is a tangible machine-readable medium that can be used to store program software code/instructions and data that, when executed by a computing device, causes one or more processors (e.g., processor 702) to perform a method(s) as may be recited in one or more accompanying claims directed to the disclosed subject matter.

In at least one embodiment, machine-readable storage media 703 may include tangible storage of the executable software program code/instructions and data in various tangible locations, including for example, ROM, volatile RAM, non-volatile memory and/or cache and/or other tangible memory as referenced in the present application. In at least one embodiment, portions of this program software code/instructions and/or data may be stored in any one of these storage and memory devices. In at least one embodiment, program software code/instructions can be obtained from other storage, including, e.g., through centralized servers or peer-to-peer networks and the like, including the Internet. In at least one embodiment, different portions of the software program code/instructions and data can be obtained at different times and in different communication sessions or in the same communication session.

In at least one embodiment, software program code/instructions and data can be obtained in entirety prior to the execution of a respective software program or application by computing device. In at least one embodiment, portions of software program code/instructions and data can be obtained dynamically, e.g., just in time, when needed for execution. In at least one embodiment, some combination of these ways of obtaining software program code/instructions and data may occur, e.g., for different applications, components, programs, objects, modules, routines or other sequences of instructions or organization of sequences of instructions, by way of example. In at least one embodiment, it may not be required that the data and instructions be on a tangible machine-readable medium in entirety at a particular instance of time.

In at least one embodiment, machine-readable storage media 703 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. In at least one embodiment, software program code/instructions may be temporarily stored in digital tangible communication links while implementing electrical, optical, acoustical, or other forms of propagating signals, such as carrier waves, infrared signals, digital signals, etc. through such tangible communication links.

In at least one embodiment, machine-readable storage media 703 includes any tangible mechanism that provides (e.g., stores and/or transmits in digital form, e.g., data packets) information in a form accessible by a machine (e.g., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Nexus®, or the like, or any other device including a computing device. In at least one embodiment, processor-based system is in a form of or included within a PDA (personal digital assistant), a cellular phone, a notebook computer, a tablet, a game console, a set top box, an embedded system, a TV (television), a personal desktop computer, etc. In at least one embodiment, traditional communication applications and subsidized application(s) may be used.

Throughout the specification, and in the claims, "connected" means a direct connection, such as electrical, mechanical, or magnetic connection between the things that are connected, without any intermediary devices.

Here, "coupled" means a direct or indirect connection, such as a direct electrical, mechanical, or magnetic connection between the things that are connected or an indirect connection, through one or more passive or active intermediary devices.

Here, "adjacent" here generally refers to a position of a thing being next to (e.g., immediately next to or close to with one or more things between them) or adjoining another thing (e.g., abutting it).

Here, "circuit" or "module" may refer to one or more passive and/or active components or software code that are arranged to cooperate with one another to provide a desired function.

Here, "signal" may refer to at least one current signal, voltage signal, magnetic signal, or data/clock signal. The meaning of "a," "an," and "the" include plural references. The meaning of "in" includes "in" and "on."

Here, "analog signal" refers to any continuous signal for which the time varying feature (variable) of the signal is a representation of some other time varying quantity, i.e., analogous to another time varying signal.

Here, "digital signal" refers to a physical signal that is a representation of a sequence of discrete values (a quantified discrete-time signal), for example of an arbitrary bit stream, or of a digitized (sampled and analog-to-digital converted) analog signal.

The terms "substantially," "close," "approximately," "near," and "about," generally refer to being within +/−10% of a target value.

Unless otherwise specified use of ordinal adjectives "first," "second," and "third," etc., to describe a common object, merely indicate that different instances of like objects are being referred to and are not intended to imply that objects so described must be in a given sequence, either temporally, spatially, in ranking or in any other manner.

Here, phrases "A and/or B" and "A or B" mean (A), (B), or (A and B). Here, phrase "A, B, and/or C" means (A), (B), (C), (A and B), (A and C), (B and C), or (A, B and C).

Here, "left," "right," "front," "back," "top," "bottom," "over," "under," and the like in description and in claims, if any, are used for descriptive purposes and not necessarily for describing permanent relative positions.

Reference in the specification to "an embodiment," "one embodiment," "some embodiments," "at least one embodiment," or "other embodiments" means that a particular feature, structure, or characteristic described in connection with the embodiments is included in at least some embodiments, but not necessarily all embodiments. Various appearances of "an embodiment," "one embodiment," or "some embodiments" are not necessarily all referring to the same embodiments. If specification states a component, feature, structure, or characteristic "may," "might," or "could" be included, that particular component, feature, structure, or characteristic is not required to be included. If specification or claim refers to "a" or "an" element, that does not mean there is only one of the elements. If specification or claims refer to "an additional" element, that does not preclude there being more than one of additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art considering the foregoing description. The embodiments of the disclosure are intended to embrace all such alternatives, modifications, and variations as to fall within the broad scope of the appended claims. Where specific details are set forth to describe example embodiments of the disclosure, it should be apparent to one skilled in art that disclosure can be practiced without, or with variation of, these specific details. Here, description is thus to be regarded as illustrative instead of limiting.

The following examples are provided that illustrate at least one embodiment. An example can be combined with any other example. As such, at least one embodiment can be combined with at least another embodiment without changing the scope of the disclosure.

Example 1 is a method for frequency spectrum sensing with optimal number of receivers, the method comprising: obtaining black and white space information of a spectrum and updating a state; selecting a location for a current receiver, wherein the location represents a time step and a frequency bin in the spectrum for the current receiver to detect one or more signals in the time step and the frequency bin; assigning the location for the current receiver; and updating a reinforcement learning model for the location which is assigned.

Example 2 is a method according to any example herein, in particular, example 1, wherein obtaining the black and white space information comprises performing a coarse band-of-interest detection.

Example 3 is a method according to any example herein, in particular, example 1, wherein performing the coarse band-of-interest detection comprises determining time steps and frequency bins where a power spectral density is above a threshold.

Example 4 is a method according to any example herein, in particular, example 1, wherein updating the state comprises updating the black and white space information and a value of a counter, wherein the value of the counter indicates a number of time steps since the frequency bin of the spectrum was last visited and an activity was detected in the frequency bin.

Example 5 is a method according to any example herein, in particular, example 1, wherein the spectrum is a time-varying spectrum.

Example 6 is a method according to any example herein, in particular, example 1, wherein selecting the location comprises: generating a random bit with a first probability of epsilon for 1 and a second probability of 1-epsilon for 0; selecting a first position of the current receiver between 1 and N if the random bit is 1; and selecting a second position of the current receiver based on a Q-function if the random bit is 0, wherein the Q-function is determined by updating the reinforcement learning model.

Example 7 is a method according to any example herein, in particular, example 1, wherein updating the reinforcement learning model comprises: collecting a reward and updating a resulting state associated with the location which is assigned.

Example 8 is a method according to any example herein, in particular, example 1, wherein the current receiver is an IQ receiver.

Example 9 is a system comprising: a plurality of receivers, wherein an individual receiver of the plurality of receivers is adapted to detect an RF signal from a location in a spectrum; a database to store signal information from the spectrum and coarse band-of-interest information; and a controller coupled to the plurality of receivers and the database, wherein the controller is to: obtain black and white space information of the spectrum from the coarse band-of-interest information, wherein the black and white space information is stored in the database; select the location for the individual receiver, wherein the location represents a time step and a frequency bin in the spectrum for the individual receiver to detect one or more signals in the time step and the frequency bin; assign the location for the individual receiver; and update a reinforcement learning model for the location which is assigned.

Example 10 is a system according to any example herein, in particular, example 9 wherein the coarse band-of-interest information is based on time steps and frequency bins of the spectrum where a power spectral density is above a threshold.

Example 11 is a system according to any example herein, in particular, example 9 wherein the controller is to update a state via an update to the black and white space information and a value of a counter.

Example 12 is a system according to any example herein, in particular, example 11 wherein the value of the counter indicates a number of time steps since the frequency bin of the spectrum was last visited and an activity was detected in the frequency bin.

Example 13 is a system according to any example herein, in particular, example 9 wherein the spectrum is a time-varying spectrum.

Example 14 is a system according to any example herein, in particular, example 9 wherein the controller is to select the location via: a random bit generation to generate a random bit with a first probability of epsilon for 1 and a second probability of 1-epsilon for 0; a first selection of a first position of the individual receiver between 1 and N if the random bit is 1; and a second selection a second position of the individual receiver based on a Q-function if the random bit is 0, wherein the Q-function is determined by updating the reinforcement learning model.

Example 15 is a system according to any example herein, in particular, example 9 wherein the controller is to update the reinforcement learning model via collection of a reward and update of a resultant state associated with the location which is assigned.

Example 16 is a system according to any example herein, in particular, example 9 wherein the individual receiver is an IQ receiver.

Example 17 is a machine-readable storage media having machine-readable instructions stored thereon that when executed cause one or more machines to perform a method for frequency spectrum sensing with optimal number of receivers, the method comprising: obtaining black and white space information of a spectrum and updating a state; selecting a location for a current receiver, wherein the location represents a time step and a frequency bin in the spectrum for the current receiver to detect one or more signals in the time step and the frequency bin; assigning the location for the current receiver; and updating a reinforcement learning model for the location which is assigned.

Example 18 is machine-readable storage media according to any example herein, in particular, example 17 wherein obtaining the black and white space information comprises performing a coarse band-of-interest detection.

Example 19 is machine-readable storage media according to any example herein, in particular, example 18 wherein performing the coarse band-of-interest detection comprises determining time steps and frequency bins where a power spectral density is above a threshold.

Example 20 is machine-readable storage media according to any example herein, in particular, example 17 wherein updating the state comprises updating the black and white space information and a value of a counter, wherein the value of the counter indicates a number of time steps since the frequency bin of the spectrum was last visited and an activity was detected in the frequency bin.

An abstract is provided that will allow the reader to ascertain the nature and gist of the technical disclosure. An abstract is submitted with the understanding that it will not be used to limit the scope or meaning of the claims.

Following claims are hereby incorporated into the detailed description, with each claim standing on its own as a separate embodiment.

We claim:

1. A method for frequency spectrum sensing with optimal number of receivers, the method comprising:

obtaining black and white space information of a spectrum and updating a state;

selecting a location for a current receiver, wherein the location represents a time step and a frequency bin in the spectrum for the current receiver to detect one or more signals in the time step and the frequency bin;

assigning the location for the current receiver; and updating a reinforcement learning model for the location which is assigned.

2. The method of claim 1, wherein obtaining the black and white space information comprises performing a coarse band-of-interest detection.

3. The method of claim 2, wherein performing the coarse band-of-interest detection comprises determining time steps and frequency bins where a power spectral density is above a threshold.

4. The method of claim 1, wherein updating the state comprises updating the black and white space information and a value of a counter, and wherein the value of the counter indicates a number of time steps since the frequency bin of the spectrum was last visited and an activity was detected in the frequency bin.

5. The method of claim 1, wherein the spectrum is a time-varying spectrum.

6. The method of claim 1, wherein selecting the location comprises:

generating a random bit with a first probability of epsilon for 1 and a second probability of 1-epsilon for 0;

selecting a first position of the current receiver between 1 and N if the random bit is 1; and selecting a second position of the current receiver based on a Q-function if the random bit is 0, wherein the Q-function is determined by updating the reinforcement learning model.

7. The method of claim 1, wherein updating the reinforcement learning model comprises:

collecting a reward and updating a resulting state associated with the location which is assigned.

8. The method of claim 1, wherein the current receiver is an IQ receiver.

9. A system comprising:

a plurality of receivers, wherein an individual receiver of the plurality of receivers is adapted to detect an RF signal from a location in a spectrum;

a database to store signal information from the spectrum and from coarse band-of-interest information; and a controller coupled to the plurality of receivers and the database, wherein the controller is to:

obtain black and white space information of the spectrum from the coarse band-of-interest information, wherein the black and white space information is stored in the database;

select the location for the individual receiver, wherein the location represents a time step and a frequency bin in the spectrum for the individual receiver to detect one or more signals in the time step and the frequency bin;

assign the location for the individual receiver; and update a reinforcement learning model for the location which is assigned.

10. The system of claim 9, wherein the coarse band-of-interest information is based on time steps and frequency bins of the spectrum where a power spectral density is above a threshold.

11. The system of claim 9, wherein the controller is to update a state via an update to the black and white space information and a value of a counter.

12. The system of claim 11, wherein the value of the counter indicates a number of time steps since the frequency bin of the spectrum was last visited and an activity was detected in the frequency bin.

13. The system of claim 9, wherein the spectrum is a time-varying spectrum.

14. The system of claim 9, wherein the controller is to select the location via:

a random bit generation to generate a random bit with a first probability of epsilon for 1 and a second probability of 1-epsilon for 0;

a first selection of a first position of the individual receiver between 1 and N if the random bit is 1; and a second selection a second position of the individual receiver based on a Q-function if the random bit is 0, wherein the Q-function is determined by updating the reinforcement learning model.

15. The system of claim 9, wherein the controller is to update the reinforcement learning model via collection of a reward and update of a resultant state associated with the location which is assigned.

16. The system of claim 9, wherein the individual receiver is an IQ receiver.

17. A machine-readable storage media having machine-readable instructions stored thereon that when executed cause one or more machines to perform a method for frequency spectrum sensing with optimal number of receivers, the method comprising:

obtaining black and white space information of a spectrum and updating a state;

selecting a location for a current receiver, wherein the location represents a time step and a frequency bin in the spectrum for the current receiver to detect one or more signals in the time step and the frequency bin;

assigning the location for the current receiver; and updating a reinforcement learning model for the location which is assigned.

18. The machine-readable storage media of claim 17, wherein obtaining the black and white space information comprises performing a coarse band-of-interest detection.

19. The machine-readable storage media of claim 18, wherein performing the coarse band-of-interest detection comprises determining time steps and frequency bins where a power spectral density is above a threshold.

20. The machine-readable storage media of claim 17, wherein updating the state comprises updating the black and white space information and a value of a counter, and wherein the value of the counter indicates a number of time steps since the frequency bin of the spectrum was last visited and an activity was detected in the frequency bin.

* * * * *